United States Patent [19]

Wagner et al.

[11] Patent Number: 5,074,580

[45] Date of Patent: Dec. 24, 1991

[54] TORSION BAR SUSPENSION ASSEMBLY FOR AN ARTICULATED VEHICLE

[75] Inventors: Oryn B. Wagner; Knute K. Brock, both of Bismarck, N. Dak.

[73] Assignee: Clark Equipment Company, Bismarck, N. Dak.

[21] Appl. No.: 574,280

[22] Filed: Aug. 28, 1990

[51] Int. Cl.⁵ .............................................. B60G 5/04
[52] U.S. Cl. .................................. 280/679; 280/684; 280/689; 280/723; 180/235; 180/242
[58] Field of Search .............. 280/679, 684, 689, 721, 280/723; 180/235, 237, 242, 353, 359, 905

[56] References Cited

U.S. PATENT DOCUMENTS

| | | | |
|---|---|---|---|
| 652,648 | 6/1900 | Sommer | |
| 1,518,937 | 12/1924 | Lansden | |
| 1,560,176 | 11/1925 | Hawkins et al. | |
| 1,620,323 | 3/1927 | Bugatti | |
| 1,971,959 | 8/1934 | Huntman | 280/689 |
| 3,014,736 | 12/1961 | Moreno et al. | 280/112 |
| 3,053,547 | 9/1962 | Osborne | 280/112 |
| 3,159,229 | 12/1964 | Thwaites | 180/235 |
| 3,243,007 | 3/1966 | Berckhan | 280/721 |
| 3,284,095 | 11/1966 | Allison | 280/124 |
| 3,311,389 | 3/1967 | Barton et al. | 280/489 |
| 3,321,216 | 5/1967 | Carter | 280/489 |
| 3,337,236 | 8/1967 | Peterson | 280/124 |
| 3,549,168 | 12/1970 | Swanson | 280/124 |
| 3,556,555 | 8/1972 | Abbott et al. | 280/124 |
| 3,680,892 | 3/1971 | Olthoff et al. | 280/489 |
| 3,698,737 | 10/1972 | Grant | 280/112 |
| 3,885,775 | 5/1975 | Bolduc | 280/689 |
| 3,915,321 | 10/1975 | Gorby et al. | 180/242 |
| 3,963,086 | 6/1976 | Mason | 180/51 |
| 4,049,071 | 9/1977 | Stedman | 180/24.05 |
| 4,094,532 | 6/1978 | Johnson et al. | 280/695 |
| 4,140,333 | 2/1979 | Thoraval et al. | 280/700 |
| 4,261,591 | 4/1981 | Warne, Jr. | 280/675 |
| 4,360,221 | 11/1982 | Wagner | 280/689 |
| 4,614,358 | 9/1986 | Wymann | 280/689 |
| 4,919,441 | 4/1990 | Marier et al. | 280/689 |

FOREIGN PATENT DOCUMENTS 2173747 10/1986 United Kingdom ............... 180/235

*Primary Examiner*—Kenneth R. Rice
*Assistant Examiner*—Mitchell Bompey
*Attorney, Agent, or Firm*—Kinney & Lange

[57] ABSTRACT

An articulated vehicle includes an articulated frame formed by front and rear frame sections which are pivotally joined. A hydraulic motor is coupled to a front pair of wheels rotatably mounted to the front frame section. An oscillating axle assembly which includes a rear pair of wheels is pivotally mounted to the rear frame section for rotation about an axis oriented parallel to the longitudinal extent of the vehicle. The rear pair of wheels are coupled to the front pair of wheels through a drive assembly. A transverse torsion bar is rotatably mounted to the rear frame section. A pair of torsion arms are rigidly mounted to opposite ends of the torsion bar and extend rearwardly toward the oscillating axle assembly. A pair of links are pivotally coupled to the torsion arms via a pair of pivot mounts. Further pivot mounts pivotally couple opposite ends of the links to opposite ends of the oscillating axle assembly. Pivotal movement of the oscillating axle assembly imparts a twisting motion to opposite ends of the torsion bar. The torsion bar resists the twisting motion and brings the oscillating axle assembly back to a level state.

19 Claims, 3 Drawing Sheets

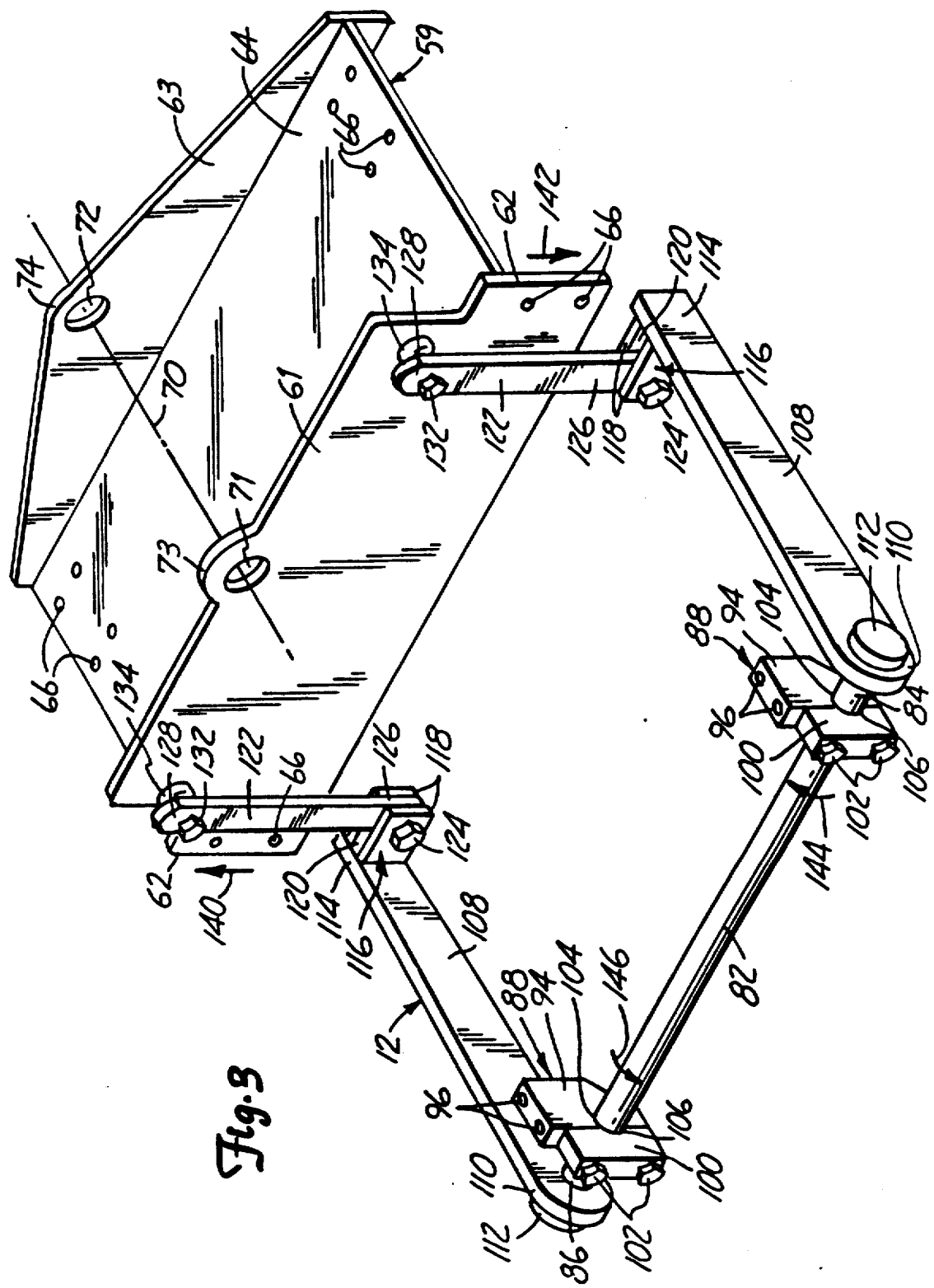

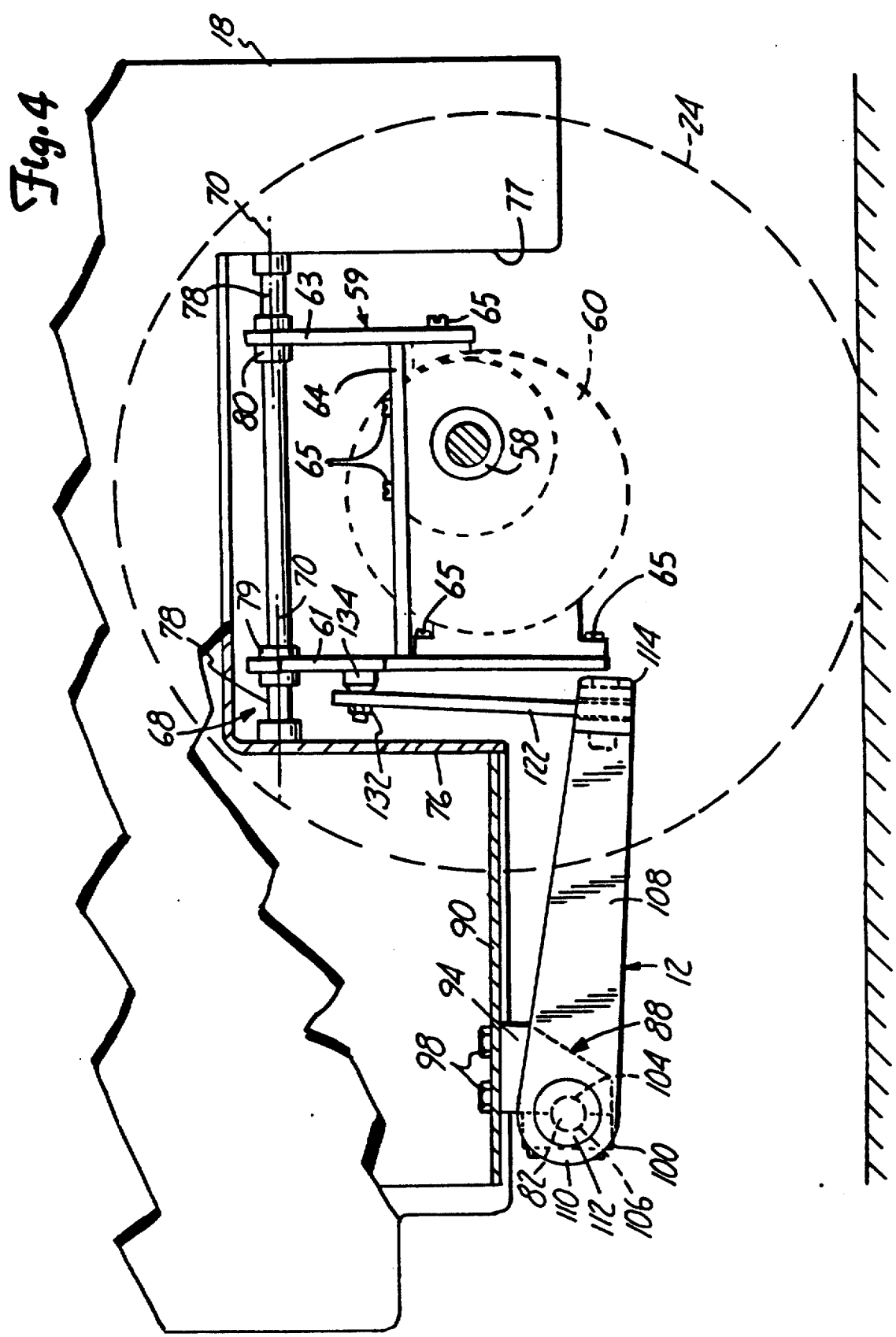

TORSION BAR SUSPENSION ASSEMBLY FOR AN ARTICULATED VEHICLE

BACKGROUND OF THE INVENTION

The present invention relates to suspension systems for vehicles. In particular, the present invention is a torsion bar suspension system for an oscillating axle assembly of an articulated vehicle.

Torsion bar suspension systems for axle assemblies on a vehicle are generally known. U.S. Pat. No. 4,360,221 to Wagner discloses one such torsion bar axle suspension system for a tractor unit. The tractor unit includes an axle assembly suspended from a frame by a pair of shock absorbing members. A torsion bar is rotatably mounted to the frame, transverse to the longitudinal extent of the tractor unit. A pair of rods are rigidly attached to each end of the torsion bar. Opposite ends of the rods are connected directly to the axle assembly by universal joints which along with the pair of shock absorbing members support the axle assembly. Equal vertical movement of each end of the axle assembly is dampened by the shock absorbers and is not impeded by the rotatable torsion bar. Unequal vertical movement of the axle assembly ends causes the rods to apply a torsional force to the ends of the torsion bar. The torque resistance of the bar restrains the unequal vertical movement of the axle assembly ends. However, the range of unequal movement between the axle assembly ends is somewhat restricted.

It is evident that there is a continuing need for improved suspension systems for off road vehicles. Specifically, there is a need for a torsion bar axle suspension system of efficient design which permits a wider range of axle movement. The torsion bar axle suspension system should also act to transfer weight to the front of the vehicle to cushion vehicle ride during road travel.

SUMMARY OF THE INVENTION

The present invention is a torsion bar suspension system for an oscillating axle assembly of an articulated vehicle. The oscillating axle assembly is supported by and pivotally attached to the vehicle frame for rotation about a pivot support having a pivot axis longitudinally oriented with respect to the frame of the articulated vehicle. A torsion bar is rotatably mounted to the frame transverse to the longitudinal extent of the vehicle and generally orthogonal to the pivot axis of the pivot support. First and second torsion arms are rigidly mounted to opposite ends of the torsion bar and extend rearwardly toward the oscillating axle assembly. When the axle assembly is oriented generally parallel to the torsion bar, the first and second torsion arms extend generally parallel to the pivot axis of the pivot support. A linkage assembly couples the axle assembly to the first and second torsion arms of the torsion bar.

The linkage assembly includes first and second links oriented generally orthogonal to the torsion bar and parallel to one another in a centered position of the oscillating axle assembly. First and second, right pivot mounts generally vertically oriented with respect to one another pivotally couple the first link to a first end of the axle assembly and to the first torsion arm, respectively. In addition, first and second, left pivot mounts generally vertically oriented with respect to one another, pivotally couple the second link to a second end of the axle assembly and to the second torsion arm, respectively. The first and second torsion arms include pivot brackets for pivotally receiving the second, right and left pivot mounts, respectively. The first and second, right and left pivot mounts are oriented generally parallel to the pivot axis of the pivot support for the oscillating axle assembly.

Pivotal movement of the oscillating axle assembly about the pivot support imparts a twisting motion to opposite ends of the torsion bar. During this pivotal movement the first and second links remain generally tangent to the arcuate paths of the first left and right pivot mounts. The torsion bar resists the twisting motion, and thereby dampens the pivotal movement of the axle assembly and brings the oscillating axle assembly back to a level state.

The vehicle frame includes a hydrostatic drive system linked to a front pair of wheels through a first differential and a pair of gear reduction mechanisms. A drive shaft extends from the first differential to a second differential associated with the oscillating axle assembly. A pair of rear wheels are linked to the second differential through gear reduction mechanisms and stub axles.

This torsion bar axle suspension system is relatively uncomplicated and allows a greater range of axle movement due to the pair of links coupling the torsion arms to the oscillating axle assembly. The links compensate for an arc formed by the link pivot connections on the axle assembly as it rotates about the longitudinal pivot axis. This arrangement provides a wider range of axle movement. This torsion bar assembly further provides resistance to the rotation of the oscillating rear axle assembly to reduce the need to add ballast to the front wheels.

BRIEF DESCRIPTION OF THE DRAWINGS

FIG. 3 is a perspective view of the torsion bar suspension assembly shown in FIG. 2.

FIG. 4 is a side view partially in section of the torsion bar suspension assembly shown in FIG. 2.

DETAILED DESCRIPTION OF THE PREFERRED EMBODIMENTS

Figure 1:
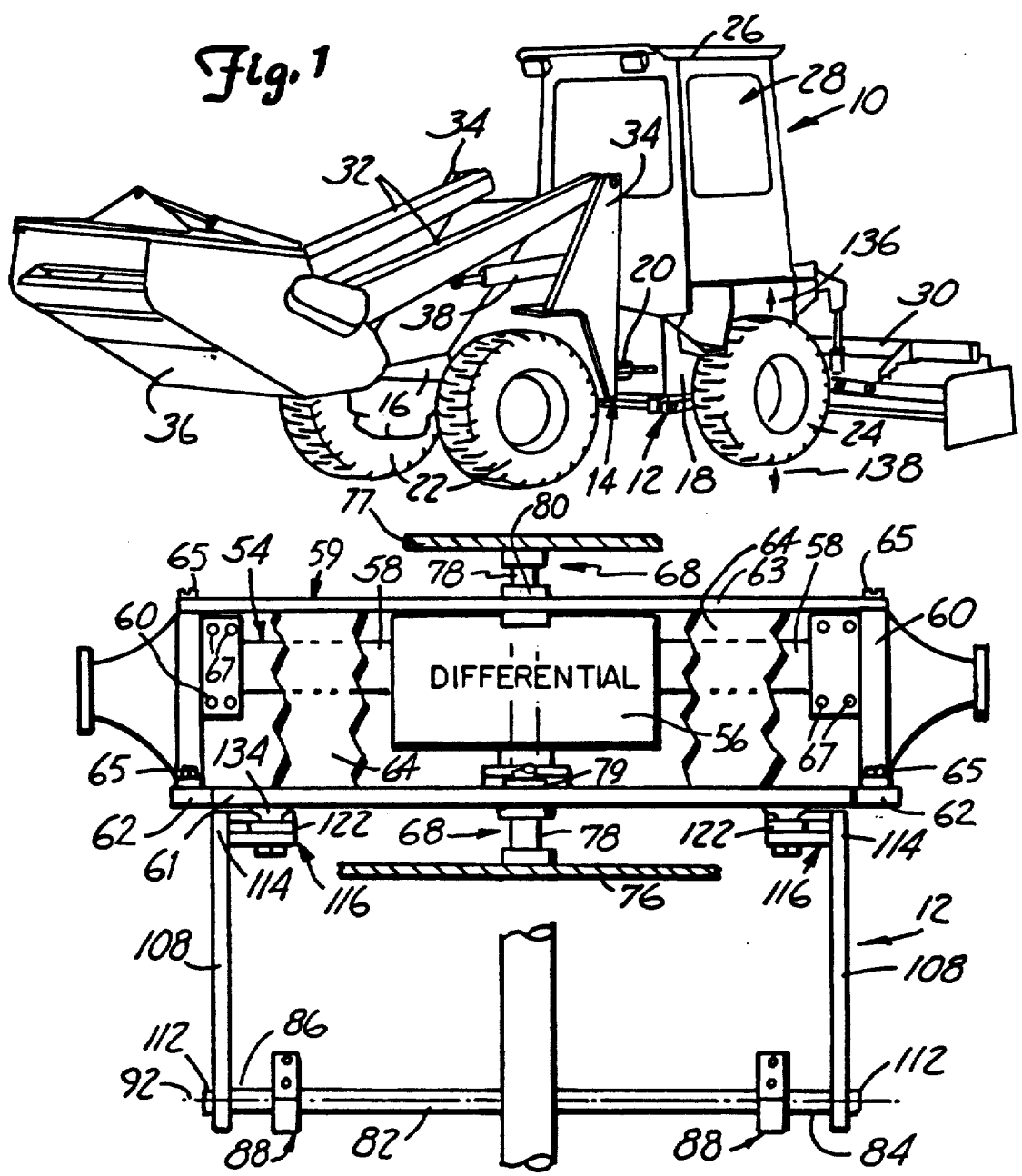
FIG. 1 is a perspective view of an articulated vehicle in which a torsion bar suspension assembly in accordance with the present invention can be implemented.
Figure 2:
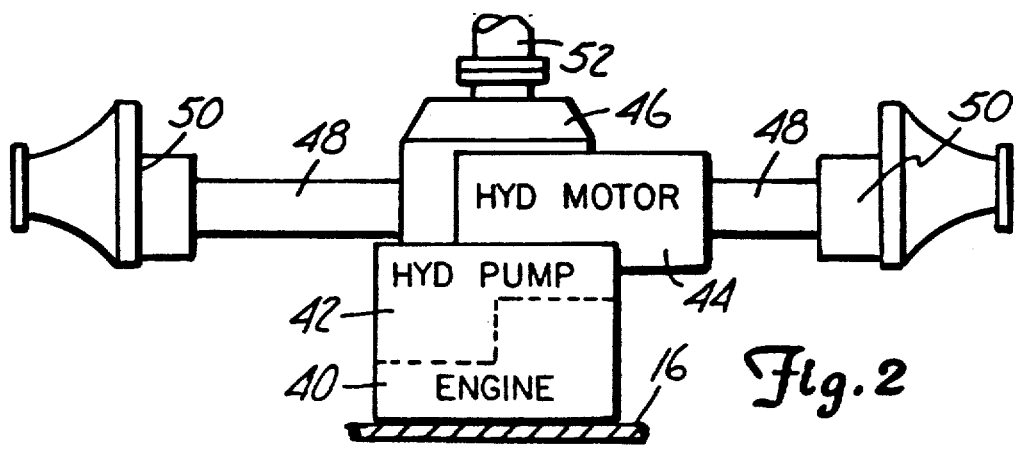
FIG. 2 is a schematic and block diagram representation of a hydrostatic transmission system for a vehicle of the type shown in FIG. 1, in association with the torsion bar suspension assembly of the present invention.

An articulated vehicle 10 which includes a torsion bar suspension assembly 12 in accordance with the present invention is illustrated generally in FIG. 1. Torsion bar suspension assembly 12 is illustrated in FIGS. 2-4 and described in detail in subsequent portions of the specification. However, a complete understanding of the torsion bar suspension assembly 12 will be facilitated by the following general description of the vehicle 10.

As shown in FIG. 1, vehicle 10 includes an articulated chassis 14 which is formed by front frame section 16 and a rear frame section 18 which are pivotally connected by a pivot mechanism 20. The pivot mechanism 20 permits pivoting about a vertical axis, and permits limited relative motion between the front and rear frame sections 16 and 18 about a horizontal axis. Articulated chassis 14 is supported for over the ground travel by a pair of front wheels 22 mounted to front frame section 16, and a pair of rear wheels 24 (only one of which is shown in FIG. 1) mounted to rear frame section 18.

Rear frame section 18 includes a cab 26, which encloses an operator's compartment 28. In the embodiment shown in FIG. 1, a box scraper 30 is attached to a rearward portion of rear frame section 18. Front frame section 16 includes a lift arm assembly 32 having a first end pivotally mounted to upright supports 34. A releasably mounted, landscape rake 36 is pivotally mounted to a second end of lift arm assembly 32. Hydraulic lift cylinders 38 (only one being visible in FIG. 1) raise and lower lift arm assembly 32 with respect to front frame section 16 in a known manner. The pitch or attitude of the landscape rake 36 is controlled about its pivots on the lift arm assembly 32 by a hydraulic tilt cylinder (not visible in FIG. 1).

As shown in FIG. 2, vehicle 10 further includes an engine 40 and a reversible variable displacement hydraulic pump 42 mounted to the front frame section 16. Hydraulic pump 42 is connected to a hydraulic fluid reservoir and/or charge pump (not shown) in a conventional manner. Hydraulic motor 44 is coupled to a first differential 46 and is driven by hydraulic pump 42. The first differential 46 includes a pair of stub axles 48 which are coupled to front wheels 22 through gear reduction mechanisms 50. Drive shaft 52 couples the first differential 46 to a second differential 56 which forms part of an oscillating axle assembly 54. Oscillating axle assembly 54 further includes a pair of stub axles 58 which link differential 56 to rear wheels 24 through gear reduction mechanisms 60.

The oscillating axle assembly 54 is further defined by a support plate assembly 59 including a front plate 61 having a pair of lateral extensions 62 (shown most clearly in FIG. 3), and a rear plate 63 spaced rearwardly from and oriented substantially parallel to the front plate 61. An intermediate plate 64 of the support plate assembly 59 couples the front plate 61 to the rear plate 63 and is oriented generally perpendicular to the front and rear plates 61 and 63. The intermediate plate 64 can be secured to the front and rear plates 61 and 63 as by welding or any other suitable means. As seen in FIGS. 2 and 4, the gear reduction mechanisms 60 are rigidly attached to the lateral extensions 62 of the front plate 61, the rear plate 63 and the intermediate plate 64 by way of mounting bolts 65. The mounting bolts 65 extend through apertures 66 (only some of which are visible in FIG. 3) in the front, rear and intermediate plates 61, 63 and 64, respectively, into threaded openings 67 (only some of which are visible in FIG. 2) in the gear reduction mechanisms 60.

A pivot assembly 68 supports the oscillating axle assembly 54 for rotation about a pivot axis 70 (see FIGS. 3 and 4) that is parallel to the longitudinal extent of the vehicle 10. The pivot assembly 68 includes first and second pivot apertures 71 and 72 (FIG. 3) extending through first and second upper edge extensions 73 and 74 located along the median of the front and rear plates 61 and 63, respectively. As seen in FIGS. 2 and 4, a pivot mount or support pin 78 extends between spaced, vertical portions 76 and 77 of rear frame section 18 to define the longitudinal pivot axis 70. First and second bearings 79 and 80 are mounted in the first and second pivot apertures 71 and 72, respectively, and are configured to receive the pivot mount 78 (which is a generally horizontal pin) to mount the oscillating axle assembly 54 for rotational movement relative to the rear frame section 18. Rotational movement of the oscillating axle assembly 54 is dampened or restrained by the torsion bar suspension assembly 12.

Torsion bar suspension assembly 12 includes a torsion bar 82 having a first end 84 and a second end 86 (see FIGS. 2 and 3). Spaced mounting blocks 88 secure torsion bar 82 to a bottom surface 90 (see FIG. 4) of rear frame section 18 forward of the oscillating axle assembly 54. The longitudinal axis 92 of torsion bar 82 extends transverse to the longitudinal extent of the vehicle 10, and is parallel to the front and rear plates 61 and 63, and the plane of pivoting movement of stub axles 58.

As seen in FIGS. 3 and 4, each mounting block 88 includes a bearing block member 94 having a pair of threaded bolt receiving apertures 96. Bolts 98 extending through the bottom surface 90 securely fasten bearing block members 94 to rear frame section 18. As an alternative, the bearing block members 94 can be welded to the bottom surface 90 of rear frame section 18. Each mounting block 88 further includes a bearing cap 100 fastened to bearing block member 94 by way of bolts 102 received in threaded apertures (not shown) of the bearing block member 94. Mating surfaces of the bearing block members 94 and bearing caps 100 include cylindrical bearing surfaces 104 and 106, respectively, for rotatably supporting torsion bar 82.

As best seen in FIG. 3, first and second torsion arms 108 have first ends 110 rigidly fixed to the first and second opposite ends 84 and 86 of torsion bar 82. The first and second torsion arms 108 extend rearwardly toward the oscillating axle assembly 54. Hubs 112 may be provided on the outer sides of the torsion arms 108. Second ends 114 of torsion arms 108 include pivot brackets 116 mounted in a generally orthogonal relationship to the longitudinal extent of the torsion arms 108.

As best seen in FIG. 3, pivot brackets 116 are formed by a pair of pivot plates 118 defining gaps 120 therebetween for receipt of substantially vertical first and second links 122. Pivot mounts, such as bolts 124, pivotally mount first ends 126 of links 122 to pivot plates 118. Second ends 128 of links 122 are pivotally secured to front plate 61 of oscillating axle assembly 54 adjacent opposite side edges of the front plate 61 by pivot mounts, such as bolts 132, extending through spacers 134.

In operation, the oscillating axle assembly 54 of the articulated vehicle 10 rotates about the pivot mount 78 as a result of differential up and down vertical movement between opposite rear wheels 24 as represented by arrows 136 and 138, respectively, in FIG. 1. Such movement may occur during road travel or when operating transversely on hills or on uneven ground. For example, as shown in FIG. 3, upward movement of one rear wheel 24 (represented by arrow 140) relative to the opposite rear wheel 24 causes rotation of the oscillating axle assembly 54, a lifting of the vehicle 10 through pivot assembly 68 and downward reacting loads (represented by arrow 142) on the opposite rear wheel 24.

This upward movement of the one side edge of the front plate 61 of the support plate assembly 59 is transmitted to the torsion arm 108 through the corresponding link 122. The torsion arm 108 adjacent arrow 140 thus lifts and imparts a torsion load between the first and second ends 84 and 86 of the torsion bar 82. The load from the link 122 adjacent the wheel 24 which lifts the torsion arm 108, tends to rotate the torsion bar 82, which in turn tends to lift the second end 114 of the other torsion arm 108 adjacent arrow 142. The link 122 adjacent arrow 142 reacts the load to the front plate 61 which in turn causes the torsion bar 82 to exert increasing torsional force resisting upward movement of the wheel 24 at arrow 140 relative to the wheel 24 at arrow 142. The torque resistance of torsion bar 82 tends to bring the oscillating axle assembly 54 back to a level state (i.e., centered position) with the rear wheels 24 sharing the load.

This torsion bar suspension assembly 12 is relatively uncomplicated and allows a greater range of pivotal movement of the oscillating axle assembly 54 and thus a greater differential vertical movement between the rear wheels 24, due to the pair of links 122 coupling the torsion arms 108 to the axle assembly 54. The links 122 will pivot about pivot mounts 124 to compensate for arcuate movement of the bolts 132 as the axle assembly 54 rotates or pivots about the longitudinal pivot axis 70. This arrangement provides for an added range of pivotal movement of the axle assembly 54. The torsion bar assembly 12 provides resistance to differential movement of one rear wheel 24 relative to the other as the oscillating axle assembly 54 pivots, to reduce the need to add ballast to the front wheels 22.

Moreover, this torsion bar assembly 12 acts to transfer weight to the digging implement (i.e., releasibly mounted, landscape rake 36 or a bucket on the front of the vehicle 10) when digging transversely on hills or on uneven ground. There is less tendency for the uphill side portion of the implement to lift off the ground because of the load reacted by the torsion bar 82 tending to restore the uphill wheel to a position where the rear wheels 24 share the load. This torsion bar assembly 12 resiliently resists rotation of the oscillating axle assembly 54 resulting in a weight transfer to the uphill portion of the implement mounted on the front frame section 16. This torsion bar suspension assembly 12 in conjunction with the oscillating axle assembly 54 also cushions vehicle ride during road travel due to the resilient reaction of the torsion forces of the torsion bar 82.

The links 122 carry tension or compression loading, depending on the direction of pivoting of the support plate assembly 59. Thus the links 122 must be made capable of carrying and reacting the necessary loads. The pivot axes of pivot mounts 124 lie in a plane parallel to the axis 92 of torsion bar 82. The connection at pivot mounts 124 and 132 can be part spherical bearings or torsion carrying bushings to accommodate slight misalignment occurring as the front plate 61 and torsion arms 108 pivot in arcuate paths.

Although the present invention has been described with reference to preferred embodiments, workers skilled in the art will recognize that changes may be made in form and detail without departing from the spirit and scope of the invention.

What is claimed is:

1. A suspension system for a vehicle having a frame, comprising:
    a torsion bar mounted to the frame and having first and second opposite ends;
    a pivot support having a pivot axis longitudinally oriented with respect to the frame;
    an oscillating axle assembly pivotally mounted on the pivot support;
    first and second torsion arms having first ends mounted to the first and second ends of the torsion bar, and extending toward the axle assembly;
    a linkage coupling the axle assembly to the first and second torsion arms, including:
        a first link oriented generally orthogonal to the torsion bar;
        first and second, right pivot mounts generally vertically oriented with respect to one another and oriented generally parallel to the pivot axis of the pivot support and generally orthogonal to a longitudinal axis of the torsion bar, the first right pivot mount pivotally coupling the first link to a first end of the axle assembly, and the second right pivot mount pivotally coupling the first link to a second end of the first torsion arm;
        a second link oriented generally orthogonal to the torsion bar and generally parallel to the first link in a centered position of the axle assembly; and
        first and second, left pivot mounts generally vertically oriented with respect to one another and oriented generally parallel to the pivot axis of the pivot support and generally orthogonal to a longitudinal axis of the torsion bar, the first left pivot mount pivotally coupling the second link to a second end of the axle assembly, and the second left pivot mount pivotally coupling the second link to a second end of the second torsion arm, the first and second links being generally tangent to the arcuate paths of the first, left and right pivot mounts as the axle assembly pivots, whereby during pivotal movement of the axle assembly about the pivot support the first and second links differentially move to cause torsion loading of the torsion bar.

2. The suspension system of claim 1 further including:
    a pair of spaced mounting blocks for pivotally mounting the torsion bar to the frame.

3. The suspension system of claim 1 wherein the longitudinal axis of the torsion bar is oriented generally orthogonal to the pivot axis of the pivot support, and wherein the first and second torsion arms are generally parallel to the pivot axis of the pivot support when the axle assembly is generally parallel to the longitudinal axis of the torsion bar.

4. The suspension system of claim 1 wherein the first and second torsion arms include a pair of pivot brackets for pivotally receiving the second, right and left pivot mounts, respectively.

5. An off road vehicle, comprising:
    a frame;
    an engine mounted to the frame;
    a first set of wheels rotatably mounted to the frame;
    a gear reduction mechanism coupled to each wheel of the first set of wheels;
    an oscillating axle assembly pivotally mounted to the frame for rotation about a pivot axis longitudinally oriented with respect to the frame, the axle assembly having a first end and a second end opposite the first end;
    a second set of wheels rotatably mounted to the axle assembly;
    a drive assembly coupling the engine to the axle assembly; and,
    a suspension system, including:
        a torsion bar assembly, including:
            a torsion bar having a first end and a second end opposite the first end;
                mounts for mounting the torsion bar to the frame;
            a first torsion arm having a first end fixedly mounted to the first end of the torsion bar and an opposite second end extending toward the axle assembly;

a second torsion arm having a first end fixedly mounted to the second end of the torsion bar and an opposite second end extending toward the axle assembly; and a linkage connecting the axle assembly to the torsion bar assembly, including:

a first link oriented generally orthogonal to the torsion bar;

first and second, right pivot mounts generally vertically oriented with respect to one another and oriented generally parallel to the pivot axis of the axle assembly, the first right pivot mount pivotally coupling the first link to the first end of the axle assembly, and the second right pivot mount pivotally coupling the first link to the second end of the first torsion arm;

a second link oriented generally orthogonal to the torsion bar and generally parallel to the first link; and first and second, left pivot mounts generally vertically oriented with respect to one another and oriented generally parallel to the pivot axis of the axle assembly, the first left pivot mount pivotally coupling the second link to the second end of the axle assembly, and the second left pivot mount pivotally coupling the second link to the second end of the second torsion arm.

6. The vehicle of claim 5 wherein the torsion bar has a longitudinal axis that is generally parallel to the axle assembly when the torsion arms are generally parallel to the pivot axis of the axle assembly.

7. The vehicle of claim 6 wherein the pivot axis of the axle assembly is oriented generally orthogonal to the longitudinal axis of the torsion bar.

8. The vehicle of claim 5 wherein the second ends of the first and second torsion arms include pivot brackets for pivotally receiving the second, right and left pivot mounts.

9. The vehicle of claim 5, wherein the mounts include a pair of mounting blocks for rotatably mounting the torsion bar to the frame.

10. The vehicle of claim 5 wherein the drive assembly includes:

a pump coupled to the engine; and a hydraulic motor coupling the pump to the axle assembly.

11. The vehicle of claim 10 wherein the drive assembly further includes:

a first differential assembly coupled to the first set of wheels and driven by the hydraulic motor;

a second differential assembly coupled to the second set of wheels; and a drive shaft coupling the first differential to the second differential, whereby power provided by the motor to the first differential is conveyed to the second differential.

12. The vehicle of claim wherein the oscillating axle assembly includes:

a front plate;

a gear reduction mechanism coupled to each wheel of the second set of wheels and mounted to the front plate; and a pair of stub axles coupling each gear reduction mechanism to the second differential, the stub axles transferring motor power to the second set of wheels.

13. The vehicle of claim 12 wherein the oscillating axle assembly further includes:

a rear plate spaced from and oriented substantially parallel to the front plate; and an intermediate plate coupling the front plate to the rear plate.

14. The vehicle of claim wherein the drive assembly further includes:

a pair stub axles coupling each gear reduction mechanism to the first differential, the stub axles transferring motor power to the first set of wheels.

15. An off road utility ,vehicle including:

an articulated chassis having pivotally connected front and rear frames;

a powered drive mechanism attached to the chassis;

a front set of wheels rotatably mounted to the front frame;

an oscillating axle assembly pivotally attached to the rear frame about a longitudinally oriented pivot axis;

a rear set of wheels rotatably mounted to the axle assembly;

a gear reduction mechanism coupled to each wheel of the second set of wheels and to the powered drive mechanism;

a torsion bar transversely mounted to the rear frame;

a first torsion arm fixedly attached to a first end of the torsion bar and extending rearwardly toward the axle assembly;

a first link oriented generally orthogonal to the torsion bar;

a first pivot mount oriented generally parallel to the longitudinally oriented pivot axis for pivotally coupling the first link to the first torsion arm; and a second pivot mount vertically spaced from the first pivot mount and oriented generally parallel to the longitudinally oriented pivot axis, the second pivot mount pivotally coupling the first link to a first end of the axle assembly, whereby pivotal movement of the axle assembly about the longitudinally oriented pivot axis imparts torsional movement to the torsion bar which acts to dampen the pivotal movement of the axle assembly.

16. The vehicle of claim 15, and further including:

a second torsion arm fixedly attached to a second end of the torsion bar and extending rearwardly toward the axle assembly;

a second link oriented generally orthogonal to the torsion bar and parallel to the first link;

a third pivot mount oriented generally parallel to the longitudinally oriented pivot axis for pivotally coupling the second link to the second torsion arm; and a fourth pivot mount vertically spaced from the third pivot mount and oriented generally parallel to the longitudinally oriented pivot axis, the fourth pivot mount pivotally coupling the second link to a second end of the axle assembly, whereby pivotal movement of the axle assembly about the pivot axis imparts torsional loading to the torsion bar, the torsional movement of the first end of the torsion bar being reacted at the second torsion arm on the second end of the torsion bar.

17. The vehicle of claim 16 further including a pair of spaced mounting blocks for pivotally mounting the torsion bar to the rear frame.

18. A suspension system for an articulated vehicle having a rear frame section and a front frame section connected together at a center pivot for relative pivoting, comprising:
- a torsion bar pivotally mounted to the rear frame section and having first and second opposite ends;
- an axle pivot support mounted on and fixed against movement relative to the rear frame section, the pivot support defining a pivot axis oriented along a longitudinal centerline of the articulated vehicle;
- an axle assembly pivotally mounted on the axle pivot support and having opposite side edges on opposite lateral sides of the axle pivot support;
- first and second torsion arms having first ends rigidly mounted to the first and second ends of the torsion bar, respectively, and extending toward the opposite side edges of the axle assembly, respectively; and
- first and second elongated links pivotally mounted at first ends thereof to the first and second torsion arms respectively, second ends of the first and second links being pivotally coupled to opposite side edges of the axle assembly, respectively, whereby during pivotal movement of the axle assembly about the axle pivot support the first and second links are moved differentially to cause the torsion bar to be loaded in torsion to resist such differential movement.

19. The suspension system of claim 18, and further including:
- a pair of spaced mounting blocks for pivotally mounting the torsion bar to the rear frame section forwardly of the axle assembly.

* * * * *

UNITED STATES PATENT AND TRADEMARK OFFICE
CERTIFICATE OF CORRECTION

PATENT NO. : 5,074,580
DATED     : December 24, 1991
INVENTOR(S) : Oryn B. Wagner et al.

It is certified that error appears in the above-identified patent and that said Letters Patent is hereby corrected as shown below:

```
        Col. 7, line 60, delete "claim" and insert
--claim 11--.
        Col. 8, line 9, delete "claim" and insert
--claim 11--.
```

Signed and Sealed this

Thirtieth Day of March, 1993

*Attest:*

STEPHEN G. KUNIN

*Attesting Officer*   Acting Commissioner of Patents and Trademarks